June 16, 1953  C. BOUDREAU  2,641,812
BELT FASTENER
Filed Nov. 21, 1951
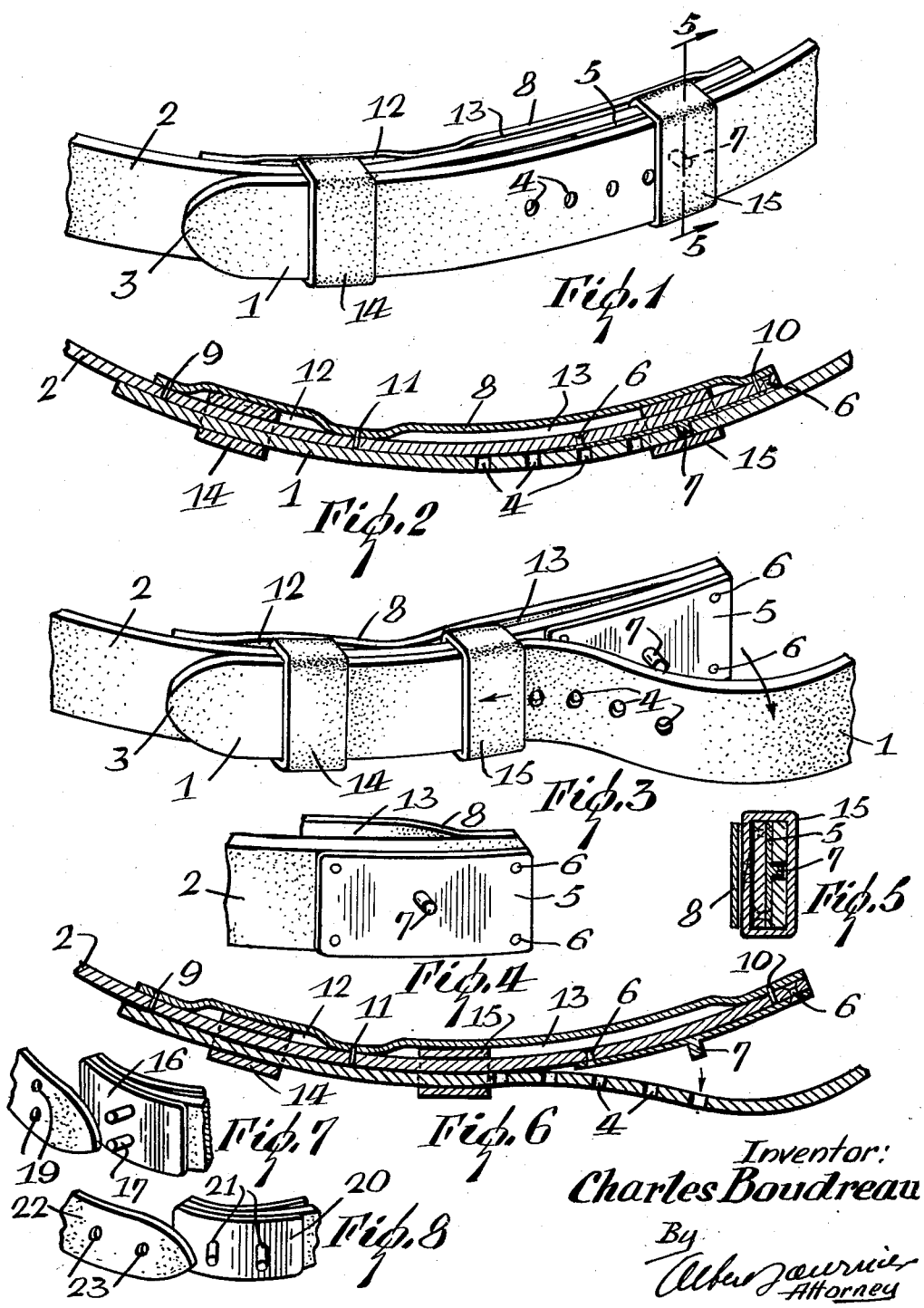
Inventor:
Charles Boudreau
By
Attorney Patented June 16, 1953

2,641,812

UNITED STATES PATENT OFFICE 2,641,812

BELT FASTENER

Charles Boudreau, Granby, Quebec, Canada

Application November 21, 1951, Serial No. 257,491
In Canada November 22, 1950

1 Claim. (Cl. 24—176)

1

The present invention pertains to a novel belt fastener designed to replace the conventional buckle.

The principal object of the invention is to provide a belt fastener that is very simple and therefore inexpensive. Another object is to provide a fastener which is easy to use, that is, which opens and closes rapidly.

A further object of the invention is to provide a fastener that does not become detached when the tension on the belt is increased or reduced. Finally, it is an object to provide a belt fastener which is practically invisible since only two loops may be seen where the ends are joined.

In the accomplishment of these objects, the novel fastener comprises a metal plate fixed to an end of the belt. The plate carries one or more pins projecting from its surface and serving as lugs or retainers. The same end of the belt is provided with a slip loop which holds the other end of the belt against the pin or pins, this other end being formed with holes to receive the pins.

The invention is fully disclosed by way of example in the following description and in the accompanying drawings in which:

Figure 1 is a perspective view showing the two ends of a belt fastened according to the invention;

Figure 2 is a plan section of Figure 1;

Figure 3 is a perspective view of the fastened ends but in a different position;

Figure 4 is a perspective view of one end of the belt;

Figure 5 is a section on the line 5—5 of Figure 1;

Figure 6 is a plan section of Figure 3;

Figure 7 is a detail perspective view of a modification, and

Figure 8 is a similar view of another modification.

Reference to these views will now be made by use of like characters which are employed to designate corresponding parts throughout.

The numerals 1 and 2 indicate respectively the two ends of a belt of leather or other suitable material. The end 1 is pointed or rounded at 3 and is formed with several equidistant holes 4. The other end 2 carries a rectangular metal plate 5 attached to its outer surface by rivets 6 at the four corners. At the center of the plate is an outwardly projecting pin 7 which serves as a retaining finger or lug. This member is fixed as distinguished from the hinged prong of a conventional buckle.

The same end 2 is also doubled by means of a leather strip 8 of the same width on the inner surface. The strip 8 is attached at its ends by stitches 9 and 10 to the belt. A third stitch 11

2 between the ends of the piece 8 forms two pockets 12 and 13, one longer than the other, to receive respectively a fixed loop 14 and a sliding loop 15 in the longer pocket. The loop 15, moreover, is capable of sliding over the metal plate 5 as shown in Figure 2. The shorter pocket 12 does not permit any material sliding of the loop 14.

In the use of the device, the end 1 of the belt is passed through the loops 14 and 15, and the pin 7 is inserted in the selected hole 4. The loop 15 is then slid over the plate 5 until it encloses the pin 7 as in Figures 1 and 2, thereby preventing unintended unfastening. To release the fastening the loop 15 is slid back off the plate 5 on the position it occupied on first inserting the end 1, as shown in Figures 3 and 6. In this position the end 1 is readily withdrawn from the retaining finger 7.

In the modification shown in Figure 7, the metal plate is provided with two fingers 17 one above the other, and the free end 18 of the belt is formed with two corresponding holes 19. The form shown in Figure 8 has a plate 20 with two fingers 21 positioned side by side. The other end 22 of the belt has two similarly spaced holes 23 to receive the fingers.

Although specific embodiments of the invention have been illustrated and described, it will be understood that various alternations in the details of construction may be made without departing from the scope of the invention as indicated by the appended claim.

What I claim is:

In a belt, a fastener comprising a plate mounted on the outer surface thereof at one end, a pin projecting outward from said plate, the other end of the belt being apertured to receive said pin, a strip secured at its ends and at an intermediate point to the inner surface of the first end to form a short pocket and a longer pocket, a loop passing through the shorter pocket and substantially fixed therein, and another loop passing through said longer pocket and slidable between said strip and said first end and adapted to enclose said pin and said apertured end.

CHARLES BOUDREAU.

References Cited in the file of this patent

UNITED STATES PATENTS

| Number | Name | Date |
|---|---|---|
| 1,559,291 | Simmons | Oct. 27, 1925 |

FOREIGN PATENTS

| Number | Country | Date |
|---|---|---|
| 4,873 | Germany | Apr. 28, 1879 |
| 462 | Great Britain | of 1863 |
| 18,288 | Great Britain | of 1890 |
| 63,127 | Norway | Jan. 20, 1941 |